United States Patent [19]

Mercenari

[11] Patent Number: 5,009,902

[45] Date of Patent: Apr. 23, 1991

[54] CONICAL TACO SHELL

[76] Inventor: Carlos A. Mercenari, Toltecas 39 0900, Mexico

[21] Appl. No.: 216,345

[22] Filed: Jul. 7, 1988

Related U.S. Application Data

[63] Continuation-in-part of Ser. No. 840,518, Mar. 17, 1986.

[51] Int. Cl.$^5$ ............................................. A21D 13/00
[52] U.S. Cl. ..................................... 426/138; 426/139; 426/125; 426/439; 99/403; 99/416; 99/426; 99/383
[58] Field of Search ............... 426/138, 125, 139, 403; 99/416, 383, 426

[56] References Cited

U.S. PATENT DOCUMENTS

| | | | |
|---|---|---|---|
| 3,424,076 | 1/1969 | Bernatz et al. | 426/138 |
| 4,313,964 | 2/1982 | Dembecki | 99/416 |
| 4,313,965 | 2/1982 | Weinstein | 426/139 |

*Primary Examiner*—Jeanette Hunter
*Attorney, Agent, or Firm*—James Markarian

[57] ABSTRACT

A fried and crispy conically shaped taco-shell made from a heart shaped flat tortilla bent along a vertical axis to form a conical shell so as to present an overlapping portion of its edge and almost closed pike. It may optionally be held inside a wet-proof conical cup covering a third or more of the total length of the shell.

6 Claims, 5 Drawing Sheets

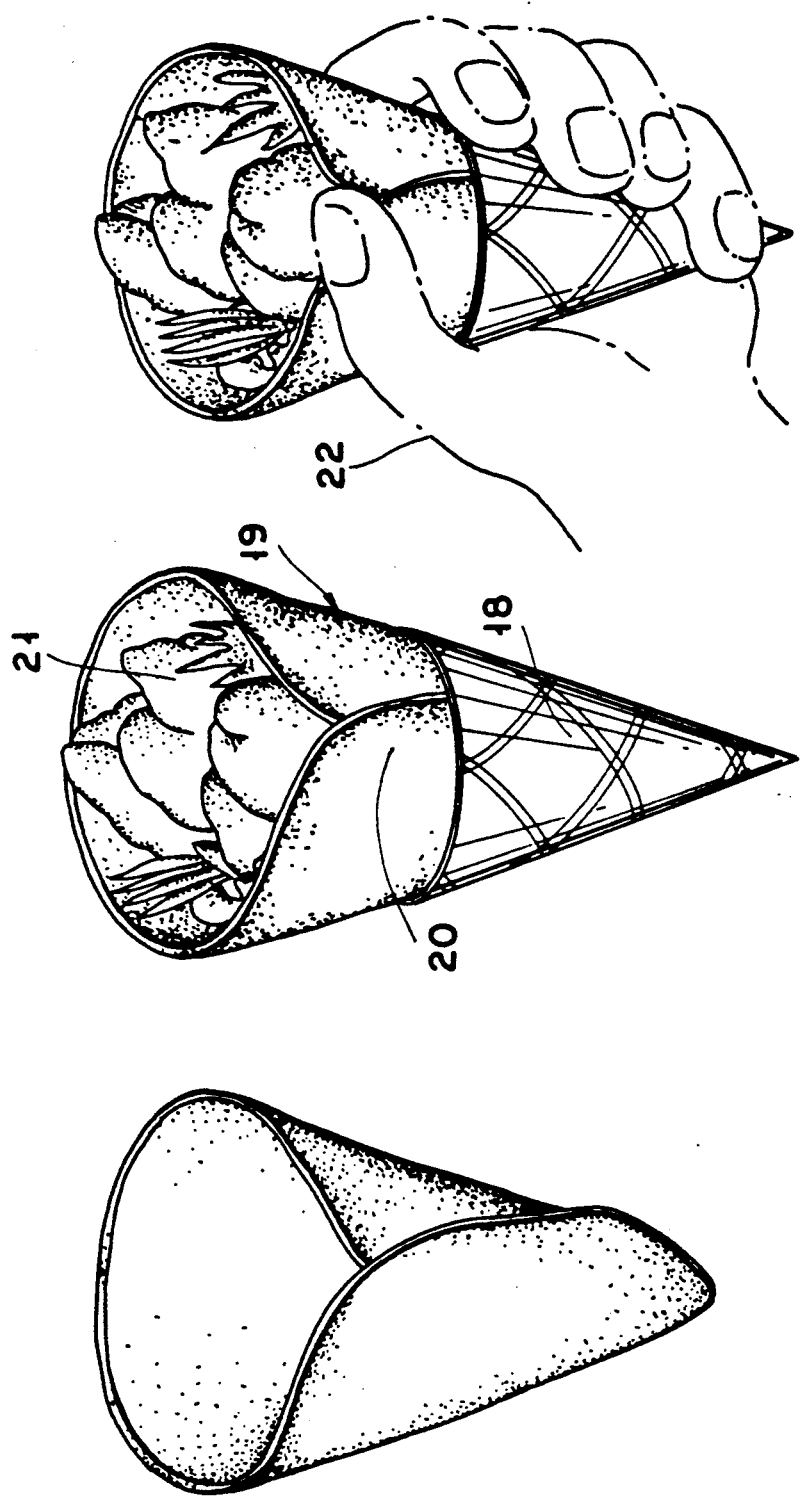

CONICAL TACO SHELL

The present invention is a continuation in part of copending application Ser. No. 840,518 filed on Mar. 17, 1986.

FIELD OF THE INVENTION

This invention belongs to the field of the snacks and fast food products industries and it comprehends both the method of producing the corresponding product and also the product itself. The later is a new and improved type of shell to be filled with eating materials including sauces and dressings that are then easily eaten together.

STATE OF THE ART

Up to now, there are in this country and particularly in the states bordering with Mexico, such as Texas, California, Arizona and New Mexico, very popular and well known so called taco-shells, which usually consist of a fried and crispy tortilla bent in a U shaped form, so as to permit the uset to fill it with all kinds of edible materials like ground meat, cheese, beans, etc., which in turn are covered with either sauces or dressings or in some cases both of them.

These taco-shells already known have many disadvantages, among which I can describe the following:
1. In order for the user to eat them he has to be in a still position, without any exterior perturbances. Normally this is a seated position in an enclosed environment.
2. Although this taco-shells are meant to be taken directly to the mouth, by the use of the bare hand, that is, without the use of any eating tools, such as knife and fork, they normally break down as the user starts to hold them with his fingers, producing a messy mixture of normally greasy materials to fall down over the user's lap or over the table where he might be seating, making the use of a plate mandatory.
3. This means that the so called fast food restaurants cannot sell the tacos through their auto service window for people to buy them and drive away, as it is normally possible with any other kind of fast food, such as sandwiches and hamburgers.
4. Also and for the same reasons, it is impossible to use these normal taco-shells as a snack at cocktails and parties where people normally do not have a place to seat and have only one hand free, due to the fact that the other is normally used for holding a glass with liquor or for greeting new-comers.
5. The shape and fragility of these normal taco-shells makes them very hard to pack and ship, making it very costly both for the manufacturer and the user.
6. The above disadvantage also makes it impossible or very expensive for the fast food chains of restaurants, to produce them in a central manufacturing and ship them around the country to their numerous outlets.

Bernatz U.S. Pat. No. 3,424,076 issued on Jan. 28, 1969 describes a cone-shaped tortilla product that has been subjected to heating to produce a crisp taco-like food container. The product is obtained by wrapping a circular piece of uncooked tortilla dough or Masa around a conical mold piece and then dropping this into an inverted cone shaped open framework that can support the dough and the cone shaped mold in a bath of cooking oil. Products obtained by this route will bear the image of the open support framework on the outside and will be difficult to separate from the framework as a result of the framework becoming to some extent embedded in the dough as a result of the weight of the cone forcing the dough onto the framework.

U.S. Pat. No. 3,604,342 (Harding issued Sept. 14, 1971) disclosed a particular apparatus for holding an uncooked or partially cooked tortilla patty in place around a conical mold member while it is converted into a crispy product by heating in cooking oil. The apparatus comprises a clamp on a pivotally mounted arm that is positioned on the conical mold that pivot to hold the patty in position while the whole assembly is placed in a bath of cooking oil. The cone member is either made of resistant material or has a slot therein which enables the cone to be squeezed so as to reduce its diameter to facilitate removal of the final crispy product from the conical mold member.

Dembecki's U.S. Pat. No. 4,313,964 discloses the production of a conical food container from tortilla dough by placing a mass of uncooked tortilla dough on a male conical member and then forcing a female conical member thereover to extrude the dough into a conical space between the male and female molds. The dough is then cooked by heating in oil or an oven. The consistency of tortilla dough, however, makes it difficult to ensure even distribution of the dough throughout the space so as to produce an acceptable product. The use of other doughs of better consistency for this purpose may detract from the flavor properties of the products.

PURPOSES OF THIS INVENTION

In order to solve the above disadvantages of the conventional taco-shells I have designed through a new type of shell for tacos which because of its specific shape has the following advantages:
1. The user enjoys total freedom of movement while eating a taco prepared with my new and improved shell; he can be standing in a shopping center, he can be walking in a playground or a park or he can be driving his car.
2. Also, with the adequate size, my improved cone-taco-shells can be used to prepare snack size tacos that people can serve at cocktail parties and buffet type of dinners.
3. With the appropriate type of tray, one with a handle and holes, my new cone-taco-shells can be used to prepare tacos that could be easily at the auto window of fast food restaurants and drive-in theaters.
4. The improved shape of my cone-shells makes it much easier and therefore cheaper to pack, ship and sell.
5. With the use of this new taco-shell the owners and operators of fast food restaurants and grocery stores are going to be able to have a central manufacturing facility and distribute them packed in much bigger containers to their outlets through out the country.
6. Also because of the special shape of the tortilla used to manufacture my new taco-shell, the manufacturer will be able to save at least 30 percent in the amount of masa (dough) per taco-shell produced with obvious economic benefits.
7. Also because of its lighter weight, my new taco-shell, is specially suited to be marketed and/or promoted as a "New light Taco-shell" among the big numbers of diet inclined or weight sensitive citizens of this country.

THE INVENTION

To overcome the herein above mentioned disadvantages of the conventional taco-shells known up to now and also to comply with the purposes of the present invention, my invention is a taco-shell consisting of a flat tortilla conically folded over so as to present an overlapping portion of its edge, and an almost closed pike. Besides it provides the method for making such taco-shells.

THE METHOD OF MAKING THESE NEW AND IMPROVED TACO-SHELLS

As because of the specific shape and properties of these new cone taco-shells it is obvious that there are no conventional machines and/or methods to make them, so I have devised a simple but efficient process to manufacture them which consists of:

Either an already manufactured and cooked tortilla is subject to a die cutting machine so as to give it a form that some how resembles a heart or an spinning top, or an already existing tortilla manufacturing machine is modified to produce this special shape tortillas instead of the normal disc shaped ones.

The tortilla used in the method of the present invention may conveniently be in the form of a sector of a circle subtending an angle of 90° to 180° at the center of the circle. The tortilla will be of such a shape that when wrapped around the conical mold a sufficient portion of the tortilla will overlap itself so as to permit proper adhesion. It is not necessary that the tortilla is exactly in the form of a sector. For example, the radial sides of the tortilla may be curved so that the piece of tortilla used has the shape of an isosceles triangle having curvilinear sides. Another shape that may be used is cardioid or in the shape of the limacon of Pascal. All that is required is that the tortilla when wrapped around the conical member will be of sufficient size to enable overlap of the material to occur and will provide a substantially even edge parallel to the base of the cone.

This speacially shaped tortilla is then rolled over itself with the flat part of the "Spinning top" facing up and inserted in a coneshaped sheet metal envelope, to which approximately 40 equidistant, ⅛ of an inch in diameter holes have been drilled. To this envelope is then inserted a solid and heavy metallic cone, somewhat smaller than the outside metal sheet, in a way that the tortilla is held between the said outside metal sheet envelope and the solid metal cone. The whole assembly (the outside envelope, the tortilla and the solid conical insert), is then submerged in a conventional frying pot which contains cooking oil preheated at an adequate temperature. After some seconds the assembly is then taken out from the frying pot and set apart in a convenient place to cool.

Once the cone-taco-shell, reaches room temperature it is wrapped in a conical cover manufactured of wet-proof materials such as wax paper, and having a length that covers only a third of the cone-taco-shells, so as to provide protection to the user from any spill off or leak of the contents.

SPECIFIC DESCRIPTION

In order to show clearly the method and the resulting product of this invention, the attached drawings show the following figures.

Figure 1:
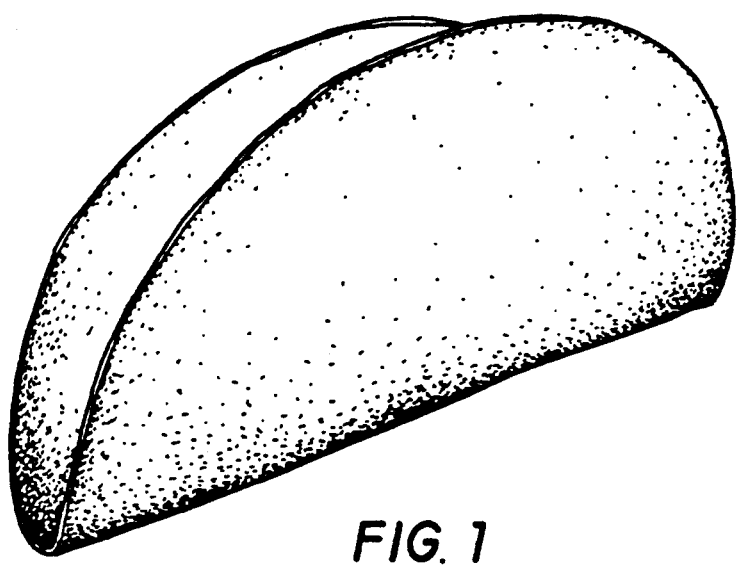
FIG. 1 Illustrates one of now used taco-shells, without any of the edible materials in it.
Figure 2:
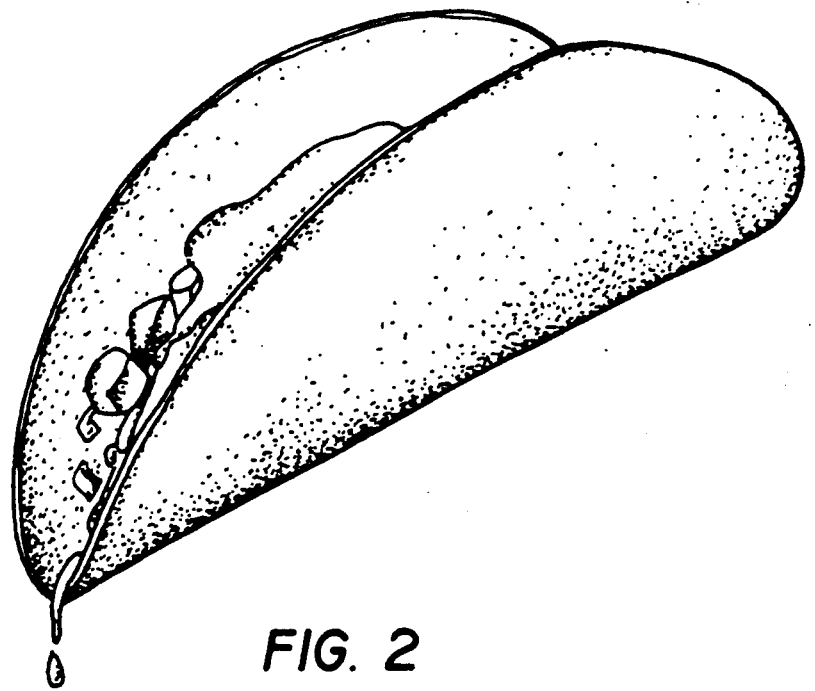
FIG. 2 Shows the same conventional type of taco-shells, now filled with edible materials, that converts the taco-shells to a so called taco ready to eat.
Figure 3:
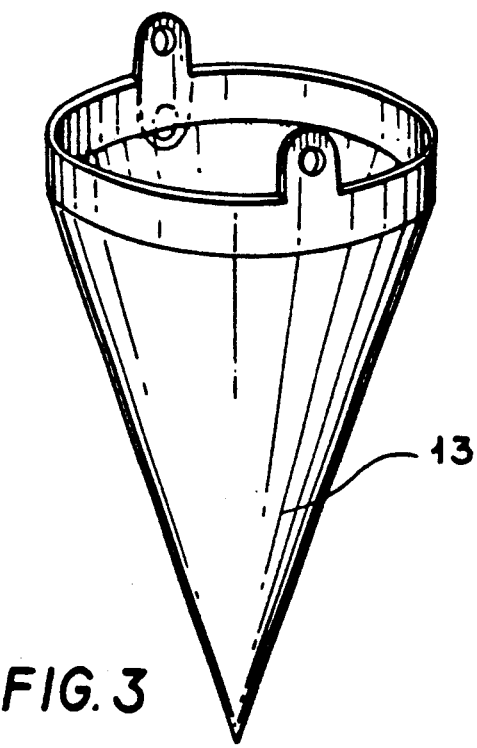
FIG. 3 Shows the solid metal conic insert.
Figure 4:
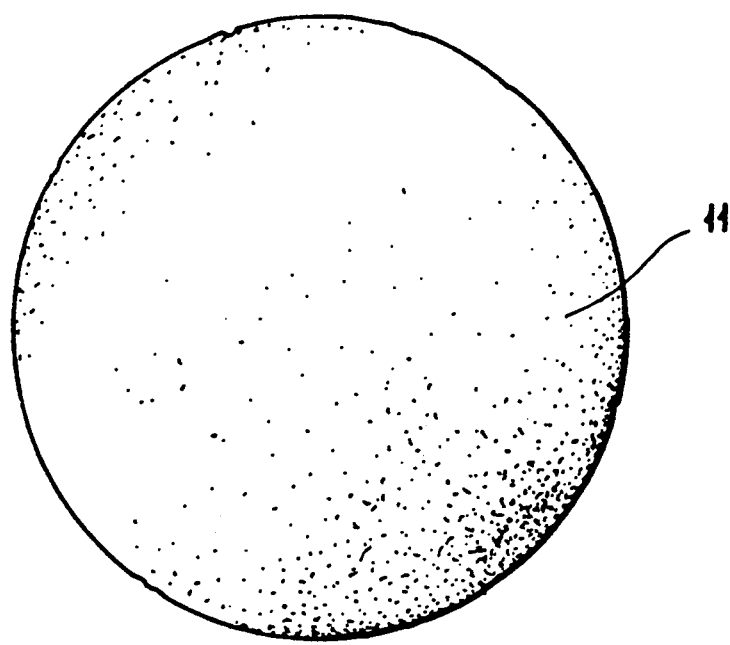
FIG. 4 Illustrates a normal tortilla.
Figure 4A:
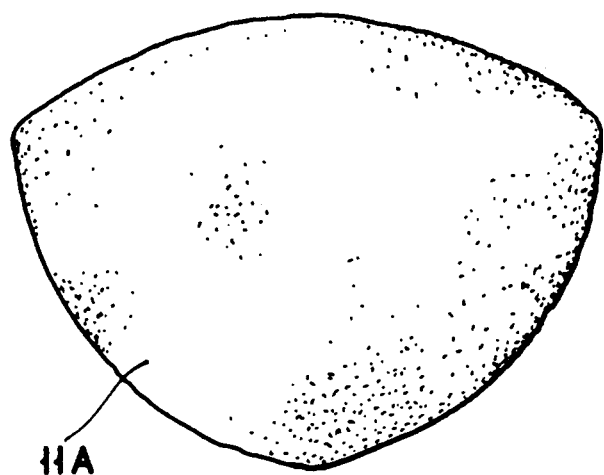

FIG. 4 BIS. Shows the same tortilla after being subject to the cutting process to give it the new special heart shaped form.

Figure 5:
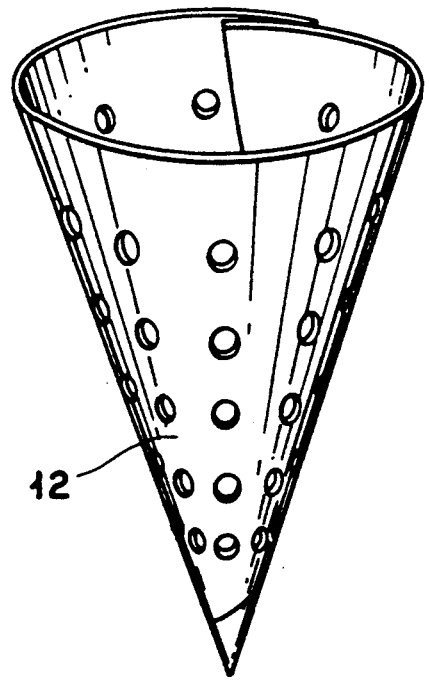

FIG. 5 Shows the outside sheet metal envelope.

Figure 6:
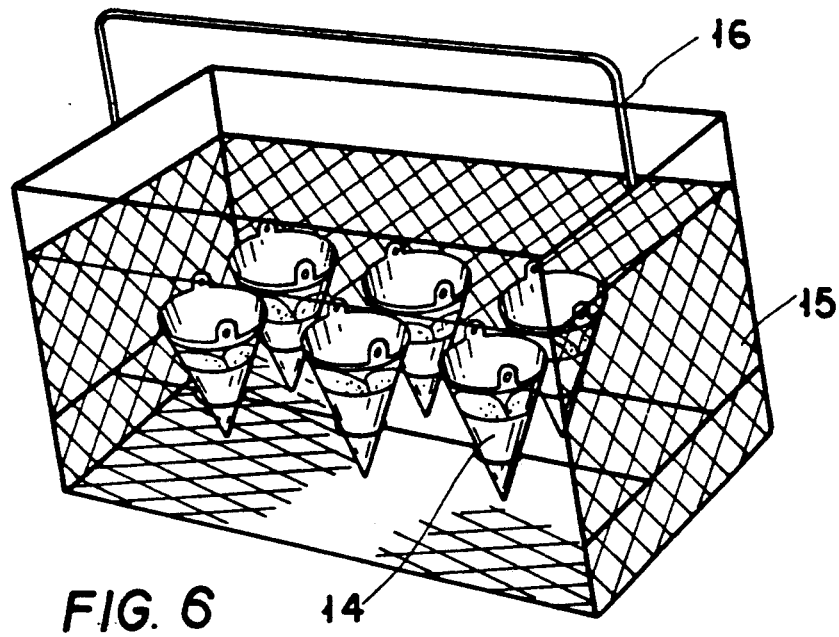

FIG. 6 Shows the wire basket used to hold several cone-shells assemblies.

Figure 7:
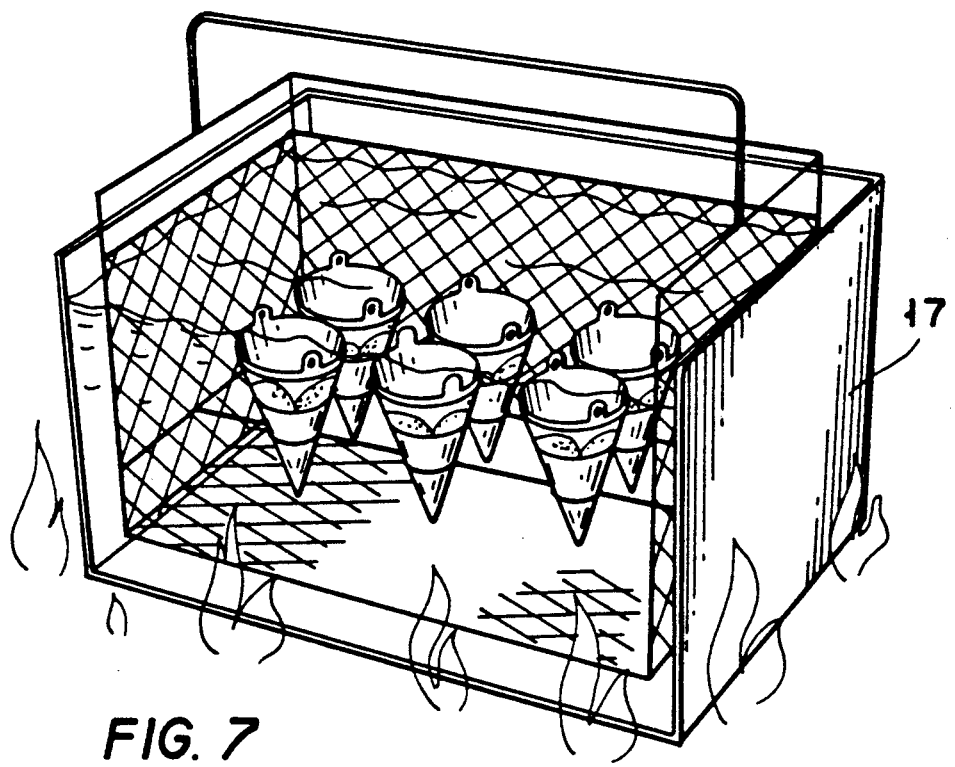

FIG. 7 Illustrates the frying pot plus the wire basket, plus the different cone-shells assemblies.

FIG. 8 shows the already fried cone-taco-shells.

FIG. 9 Shows the cone-taco-shell stuffed with edible materials which convert it in a cone-taco.

FIG. 10 Illustrates the same cone-taco being held by a consumer's hand at the portion protected by the conventional wet-proof conver.

Refering to the mentioned drawings and figures, the new and improved taco-shells of my invention consist of either a flat tortilla 11, then subject to a cutting process so as to give it a new special heart shaped form 11 BIS or an already heart shaped tortilla 11 BIS produced mechanically in a tortilla manufacturing machine, which is manually adhered or set to a cover 12, preferably made of stainless metal sheet which ca also be made with any suitable material. Then a heavy solid metal cone 13, also preferably made of stainless steel or other heavy adequate material,in inserted into the cover 12, so as to keep the tortilla firmly held adhered to the outside cover 12. Once an adequate number of sets 14 are ready, they are placed into a wire cage 15, provided with a handle 16, and the cage is then immersed in a conventional frying pot 17 until the cone-shells are totally fried, at which time they are taken away from the pot and left alone in a suitable place to get cool.

Once cool, it is inserted a protective wet-proof cover 18 which covers the bottom portion, about one third, of the cone-shell.

THE NEW CONE-TACO-SHELLS

The product resulting from the described method is, as suggested from the descriptive name already used (cone-taco-shells) and as shown in FIG. 9, a cone 19, having an overlapping portion 20, already fried and ready to be filled with any edible materials 21. Of course that in order to prevent dripping the cone-taco-shells can be fitted with a conventional wet-proof protective cone 18, inserted at the bottom of the cone-taco-shells, thus permitting the hand 22 of the mentioned consumer to take it and handle it without greasing his fingers.

It is clearly understood that the above description refers to preferred features of the method and of the resulting product, but, the scope of the invention and of the protection deserved is limited only by the following claims:

I claim:

1. Process of manufacturing cone-taco-shells which comprises the steps of rolling cooked heart shaped tortilla to form a cylinder placing said cylinder in a cone shaped sheet metal envelope; inserting a solid and heavy metallic cone into the sheet metal envelope containing the tortilla to hold the tortilla between said outside metal sheet and the solid metal cone; submerging the whole assembly in which cooking oil preheated to a temperature effective to fry the tortilla in a few seconds and removing the assembly from the oil and allowing it to cool.

2. A process as set forth in claim 1 which comprises the additional step of inserting, after frying and cooling, a conventional cover manufactured of wet-proof materials having a length that covers only a third of the cone-taco-shells, at the bottom thereof, so as to provide protection to the user from any spill off or leak of the contents.

3. A process as set forth in claim 1 wherein an adequate number of assemblies are placed inside a wire cage provided with a handle, and then the cage is immerced in a conventional frying pot until the cone-shells are totally fried.

4. A process according to claim 1, wherein the tortilla employed is in the shape of a limacon of Pascal.

5. Cone-taco-shells produced by the process of claim 1.

6. Cone-taco-shells as produced by the process of claim 2 wherein the conical shaped taco-shell is held inside a wet-proof conical cup covering at least a third of the total length of the shell so as to provide protection to the user from any spill off or leak of the contents.

* * * * *